United States Patent
Martin et al.

(10) Patent No.: US 6,275,680 B1
(45) Date of Patent: Aug. 14, 2001

(54) HARDWARE PCH CHECKING FOR PERSONAL HANDYPHONE SYSTEM PORTABLE STATION

(75) Inventors: Varenka Martin; Denis Archambaud, both of Antibes; Patrick Feyfant, Toulon; Philippe Gaglione, Mandelieu; Satoshi Yoshida, Nice; Laurent Winckel, Antibes; Oliver Weigelt, Antibes, all of (FR)

(73) Assignee: Philips Semiconductors, Inc., Sunnyvale, CA (US)

( * ) Notice: Subject to any disclaimer, the term of this patent is extended or adjusted under 35 U.S.C. 154(b) by 0 days.

(21) Appl. No.: 08/902,202

(22) Filed: Jul. 29, 1997

(51) Int. Cl.[7] .................................................. H04M 3/42
(52) U.S. Cl. ................... 455/31.2; 455/458; 340/825.44
(58) Field of Search ................... 455/31.1, 426, 455/31.2, 31.3, 458, 459, 343, 574, 38.3, 410, 411, 13.14, 433; 340/825.44, 311; 370/241; 375/354, 355, 356

(56) References Cited

U.S. PATENT DOCUMENTS

| | | | |
|---|---|---|---|
| 4,408,099 | * | 10/1983 | Ishii ..................................... 455/31.2 |
| 5,058,203 | * | 10/1991 | Inagami ................................ 455/89 |
| 5,151,897 | * | 9/1992 | Suzuki ................................. 370/401 |
| 5,301,225 | * | 4/1994 | Suzuki et al. ......................... 379/59 |
| 5,471,643 | * | 11/1995 | Marui .................................. 455/33.1 |
| 5,489,894 | * | 2/1996 | Murray ............................... 340/825.44 |
| 5,572,197 | * | 11/1996 | Matsumoto ....................... 340/825.44 |
| 5,680,418 | * | 10/1997 | Croft et al. ........................... 375/346 |
| 5,739,759 | * | 4/1998 | Nakazawa et al. ............. 340/825.44 |
| 5,903,828 | * | 5/1999 | Martin et al. ......................... 455/343 |
| 5,905,965 | * | 5/1999 | Asano et al. ......................... 455/574 |
| 5,910,944 | * | 6/1999 | Callicotte et al. .................... 370/311 |
| 5,915,214 | * | 6/1999 | Reece .................................. 455/406 |
| 6,041,217 | * | 3/2000 | Martin et al. ....................... 455/38.3 |

OTHER PUBLICATIONS

"Personal Handy Phone System ARIB Standard Version 2 RCR STD–28", *Association of Radio Industries and Businesses (ARIB)*, Introduction, Table of Contents, pp. 1–177 and 481–487 (Dec. 26, 1995).

\* cited by examiner

*Primary Examiner*—William Trost
*Assistant Examiner*—Conavin Tran

(57) ABSTRACT

A circuit arrangement on a handset for checking paging information transmitted in a personal handyphone system. The circuit arrangement includes a memory portion for storing the identification numbers of the handset and the cell station from which the handset receives calls, and an interrupt generator for comparing transmitted identification numbers of a called handset and a cell station with the stored identification numbers of the handset and the cell station and for generating an interrupt when the stored identification number of the handset matches the transmitted identification number of the called handset and the stored identification number of the cell station matches the transmitted identification number of the cell station.

15 Claims, 4 Drawing Sheets

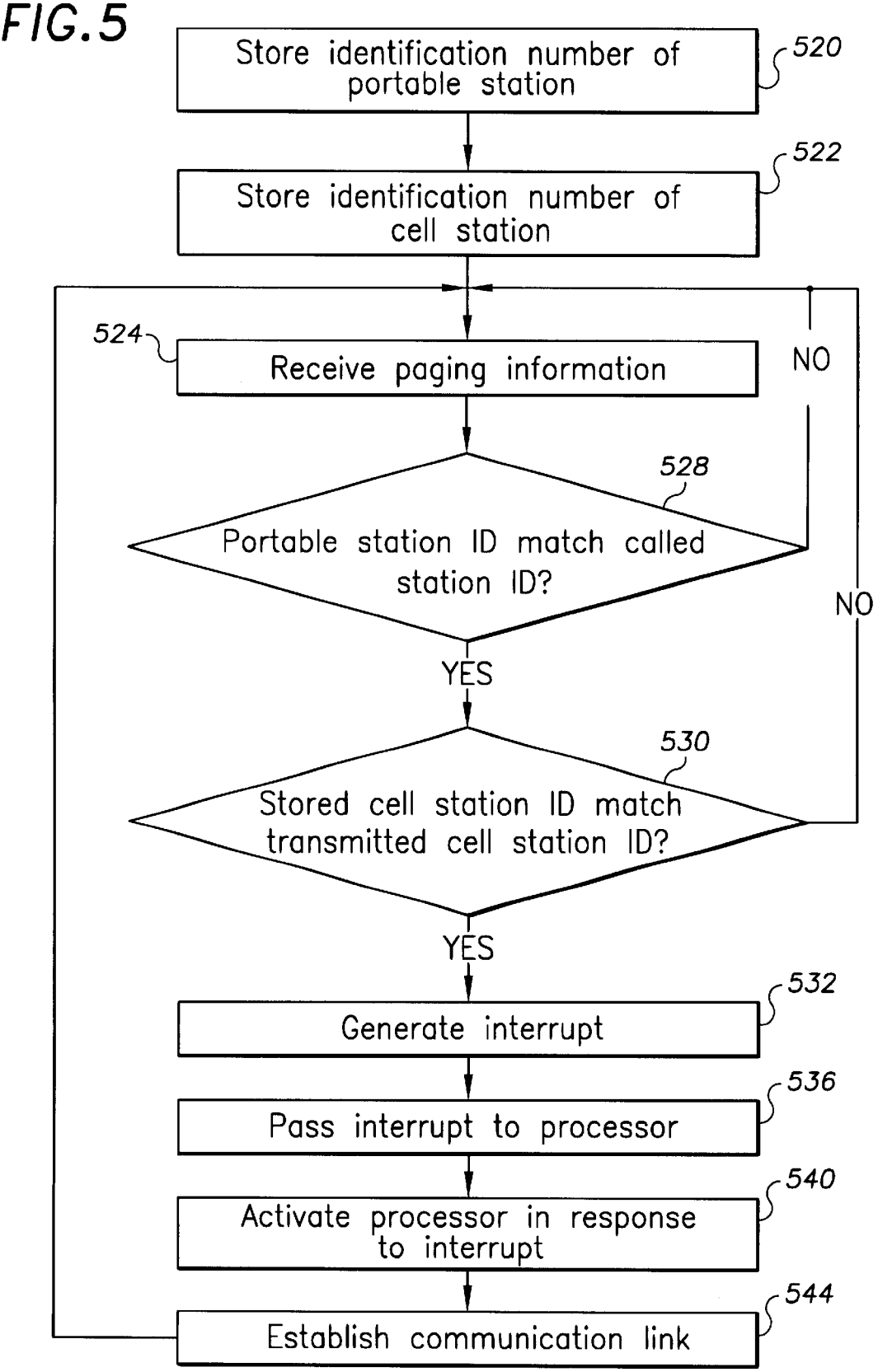

HARDWARE PCH CHECKING FOR PERSONAL HANDYPHONE SYSTEM PORTABLE STATION

BACKGROUND OF THE INVENTION

The present invention relates to an apparatus and method for checking paging information transmitted in a Personal Handyphone System (PHS), and in particular, to an apparatus and method for reducing power consumption by a PHS portable station when checking paging information.

Cellular telephone communications systems allow users to communicate via portable stations or handsets without the use of a wire or cable connection. Voice and data is transmitted in cellular telephone technology through radio waves at a particular frequency. By eliminating the need for a hard-wire connection, cellular telephones can be used, for example, in a car or on an airplane. The increased use of cellular telephones in recent years is due in large part to this mobile feature.

There are various cellular telephone services under which cellular telephones operate. One system is the Personal Handyphone System (PHS). The PHS is a high capacity fully digital mobile cellular telephone service that was originally launched in Japan in 1995. Like other cellular telephone services, the PHS has its own operation standard governing the use of radio facilities and equipment that transmit over radio waves within the system.

A desirable feature for any cellular telephone is a handset that is sized to allow it to be easily managed and transported. For example, it is preferable to provide a handset with an overall size that can be carried in a handbag, such as a purse, or a pocket of a jacket.

One of the components of a handset that significantly affects the overall size of the handset is the battery. The battery is removably attached to the handset to provide power needed to operate the handset. When power is depleted from the battery, it is removed and recharged or replaced with another battery. While a smaller battery may be preferred for convenient transporting of the handset, a smaller sized battery compromises the amount of power that the battery provides to the handset between charges.

A typical handset continuously drains power from the battery when the handset is in a standby mode or is otherwise processing control information associated with a data transfer to the handset. During standby, the handset's processor continually receives and processes packets of control information unique to particular data transfers. The control information may include the identification numbers of the called handset, the calling handset, and the base station that facilitates the transmission between the called handset and the calling handset. Moreover, the control information may identify the attributes or the type of data that is being transmitted. By processing the control information during standby, a handset determines, for example, if it is the called station. If so, a communication link is initiated to the calling station. Similarly, once a communication link is established, the handset continues to process control information relating to that data transfer. Not surprisingly, the processing of control information at the handset's processor draws considerable power from the battery. In turn, this limits the length of time for which a handset can operate with a given battery.

A possible solution to the problem of power consumption is to increase the size of the battery or to carry one or more spare batteries to replace a depleted battery. Both of these options, however, minimize the mobility advantages offered by cellular telephone technology as it increases the size of the handset or the number of components that are needed to operate the handset.

Based on the foregoing, it can be seen that a tension exists between providing a conveniently-sized cellular telephone handset and the desire to reduce power consumption of the handset to increase the period of time between charging.

SUMMARY OF THE INVENTION

The present invention is directed to a circuit arrangement on a handset for checking paging information transmitted in a personal handyphone system. The paging information includes the identification number of the called handset and the identification number of the cell station transmitting the paging information. The circuit arrangement includes a memory portion for storing the identification number of the handset, and an interrupt generator for comparing the transmitted identification number of the called handset with the stored identification number of the handset and for generating an interrupt to activate the handset processor when the identification numbers match.

A more detailed embodiment of the present invention stores in the memory portion of the handset the identification number of the cell station from which the handset receives calls. In this embodiment, the interrupt generator compares the transmitted identification number of the called station with the stored identification number of the handset and further compares the transmitted identification number of the cell station with the stored identification number of the cell station. If both comparisons result in a match, the interrupt generator generates an interrupt to activate the handset processor.

The present invention is further directed to a method for checking paging information transmitted in a personal handyphone system. The method includes storing the identification number of the handset in a memory portion, generating an interrupt when the stored identification number of the handset matches the transmitted identification number of the called handset, passing the interrupt to the processor, and establishing a communication link in response to receipt of the interrupt at the processor. In a more detailed embodiment, the method further includes storing the identification number of the cell station from which the handset receives calls, and generating an interrupt when identification numbers of the transmitted called station and cell station match the stored identification numbers of the handset and cell station.

The above summary of the present invention is not intended to describe each illustrated embodiment or every implementation, of the present invention. This is the purpose of the figures and of the detailed description that follow.

BRIEF DESCRIPTION OF THE DRAWINGS

Other aspects and advantages of the invention will become apparent upon reading the following detailed description and upon reference to the drawings in which:

FIG. 5 is a flowchart illustrating the invention in FIG. 4, including further steps for checking paging information in a personal handyphone system.

Figure 1:
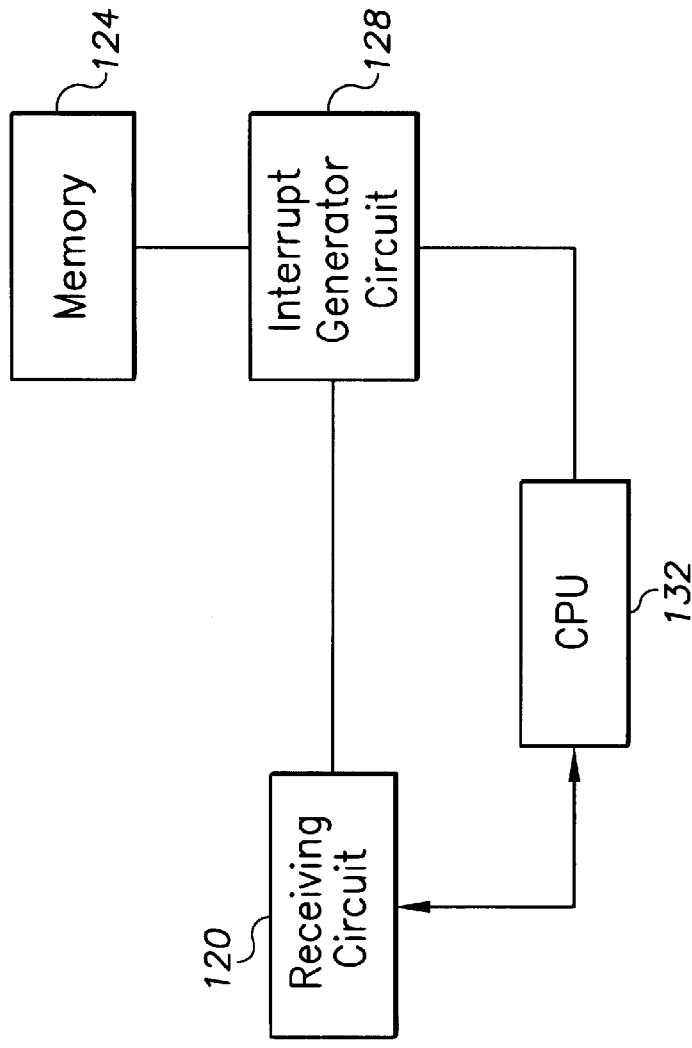
FIG. 1 illustrates an exemplary hardware circuit in a cellular telephone for use in accordance with one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives fitting within the spirit and scope of the invention as defined by the appended claims.

DESCRIPTION OF THE ILLUSTRATED EMBODIMENTS

In exemplary embodiments of the present invention, a hardware circuit arrangement, apart from the processor, on a cellular telephone handset is configured and arranged to monitor transmitted control information with reduced power consumption. When a handset is in standby mode, waiting to receive a call, the hardware circuit arrangement monitors control information transmitted in a paging channel. The control information includes the identification number of the particular telephone to which the subsequent data is to be transmitted (i.e., the called telephone) and the identification number of the cell station transmitting the incoming data.

FIG. 1 illustrates an exemplary system, including a hardware circuit arrangement apart from the processor 132, for checking paging information with reduced power consumption in a cellular telephone. The system of FIG. 1 includes receiving circuit 120 which receives the control information transmitted in a paging channel. Receiving circuit 120 is coupled to interrupt generator circuit 128. Receiving circuit 120 passes received control information to interrupt generator circuit 128. Interrupt generator circuit 128 is coupled to memory portion 124. Memory portion 124 stores the identification number of the cellular telephone containing the system of FIG. 1 and the identification number of the cell station currently designated for transmitting data to that particular cellular telephone. Thus, the stored cell station identification number identifies the cell station from which the cellular telephone is to receive transmitted calls.

Memory portion 124 may be one memory block or multiple discrete memory blocks. In one embodiment, memory portion 124 is a read only memory such as an erasable programmable read only memory (EPROM). It can be appreciated, however, that other types of memory, such as a random access memory (RAM), may be used. The telephone handset identification number may be more permanently fixed in a memory. It can be further appreciated that the stored cell station identification number may need to change when the cell station responsible for transmitting to the particular telephone handset changes. In order to accommodate such a change, one embodiment of the present invention specifically uses a reprogrammable memory for storing the cell station identification number.

Interrupt generator circuit 128 compares the two stored identification numbers with the corresponding transmitted identification numbers in the control information of the paging channel. Interrupt generator circuit 128 is coupled to processor 132. Processor 132 receives signals from interrupt generator circuit 128 that communicate the results of the comparisons performed at interrupt generator circuit 128.

In one embodiment of FIG. 1, the interrupt generator circuit 128 compares the identification number of the called station transmitted in the paging channel with the identification number stored in the handset that is unique to that particular handset. If the identification number of the called station transmitted in the paging channel matches the stored identification number of the handset, the interrupt generator circuit 128 produces an interrupt signal. The interrupt signal passes to the processor 132. The processor 132 activates in response to the interrupt, and, once activated, establishes a communication link for the cellular telephone. It will be appreciated that in certain embodiments it is sufficient to use only the handset identification number to generate the interrupt. In this case, in certain embodiments the cell station identification number may not be stored or retained.

In another embodiment of FIG. 1, the interrupt generator circuit 128 is further configured to compare the identification number of the transmitting cell station contained in the control information of the paging channel with the cell station identification number stored in the memory portion 124 of the handset. If the transmitted cell station identification number differs from the stored cell station identification number, then the call is transmitted from a cell station that is not intended for receipt at the cellular phone. Therefore, even if the transmitted identification number of the called station matches the stored identification number of the cellular telephone, the processor 132 is not activated to establish a communication link. However, when both the transmitted and stored cell station identification numbers match and the transmitted and stored cellular telephone identification numbers match, the interrupt generator circuit 128 generates and passes an interrupt to the processor 132. Upon receipt of the interrupt, the processor 132 activates (i.e., wakes up) and establishes a communication link.

The elements of FIG. 1 are typically powered by a power supply (not shown). The power supply may be, for example, a portable battery that removably attaches to the telephone handset.

Monitoring the control information with a hardware circuit arrangement located on the cellular telephone separate from the telephone's processor saves significant power. When the hardware circuit arrangement configured according to the present invention monitors control information, the processor and the processor's memory are in a power down mode. The processor and its corresponding memory activate only after the separate hardware circuit arrangement detects a call to that particular handset from the appropriate cell station. As such, the processor and memory are not drawing significant power from the cellular telephone battery during standby mode. Since the hardware circuit arrangement requires significantly less power to operate than the processor and its corresponding memory, use of the hardware circuit arrangement to monitor during standby provides significantly less drain on the battery.

Figure 2:
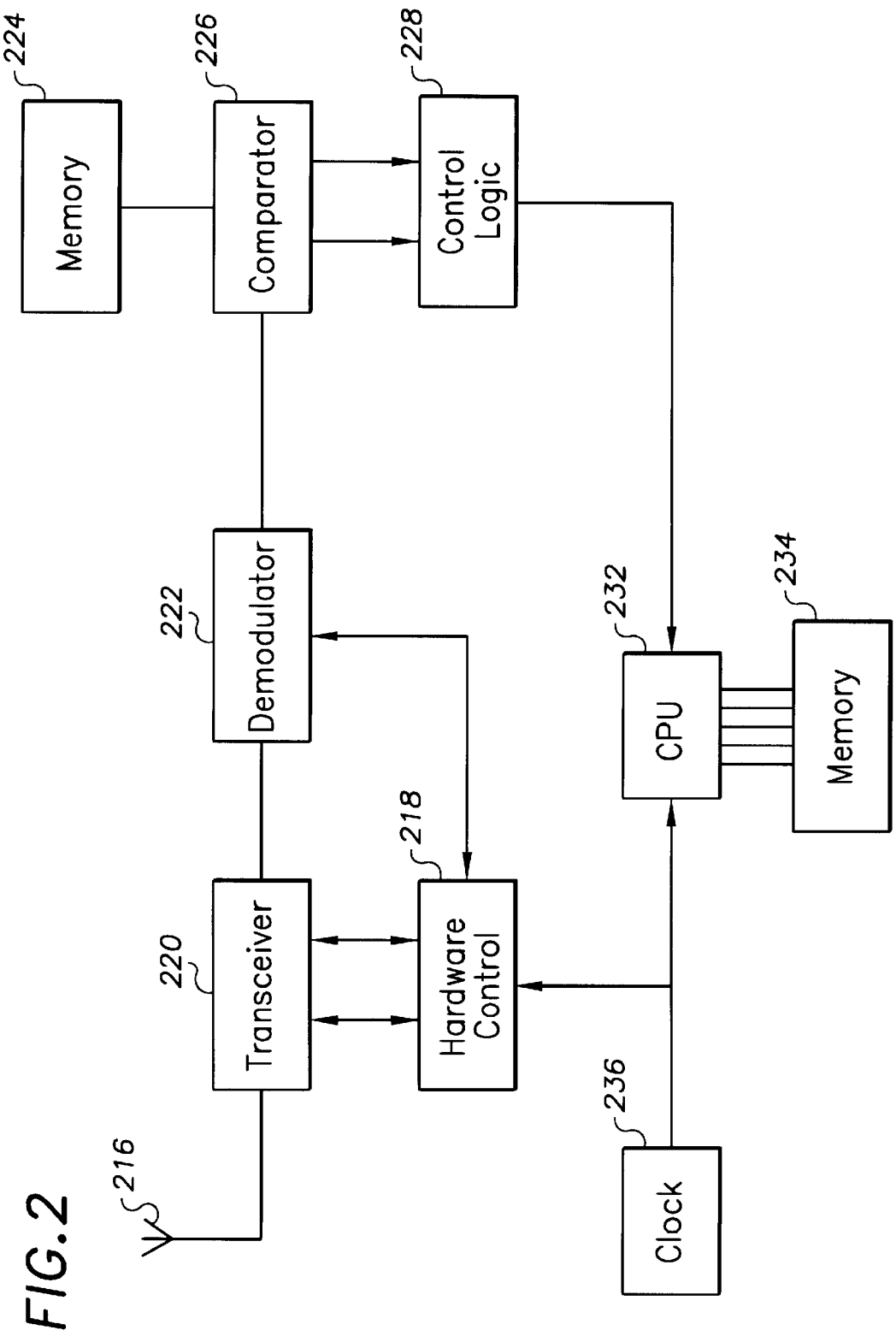
FIG. 2 illustrates another embodiment of a hardware circuit in accordance with the present invention.

FIG. 2 illustrates another embodiment of the invention in block diagram form. Antenna 216, which receives control information transmitted in the paging channel, connects to transceiver 220. Transceiver 220 connects to demodulator 222. It should be appreciated that transceiver block 220 represents any type of transmitter/receiver arrangement whether incorporating common elements or formed separately. A hardware controller 218 connects to and bidirectionally communicates with both transceiver 220 and demodulator 222. The hardware controller 218 controls the hardware of the system of FIG. 2 in a manner well known in the art. Control information received at antenna 216 passes to transceiver 220 which in turn passes to demodulator 222. The control information then passes to comparator 226 which connects to demodulator 222. Comparator 226, which is coupled to memory portion 224, compares the identification numbers transmitted as control information of the paging channel with the stored identification numbers from memory portion 224.

In one embodiment, comparator 226 produces two separate output signals that pass to control logic 228. These two outputs correspond to the output of two separate comparisons performed in comparator 226. The first comparison is between the transmitted called station identification number and the stored identification number of the cellular telephone. The second comparison is between the transmitted cell station identification number and the stored cell station identification number.

Control logic 228 is coupled to processor 232. Control logic 228 receives output signals from comparator 226 and generates an output which passes to processor 232. Processor 232 is coupled to memory 234 which functions as the basic processor memory for processor 232. The processor 232 is also bidirectionally coupled to the hardware controller 218.

The system of FIG. 2 further includes master clock 236. Master clock 236 connects to hardware control 218 and processor 232. The master clock 236 is used for general system operations. The clock 236 may also be used, for example, in connection with a timer to power down the processor after a predetermined period of time of inactivity.

Figure 3:
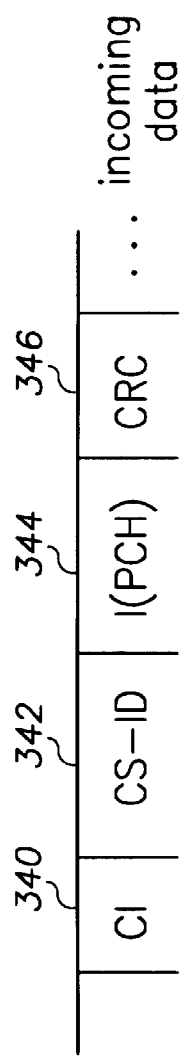
FIG. 3 illustrates the basic physical slots of the paging channel in a personal handyphone system.

FIG. 3 illustrates the basic physical slots of a paging channel in a personal handyphone system. This slot structure is uniformly established through the personal handyphone system standard. The "CI" slot location 340 consists of 4 bits and represents the channel identifier. Slot location "CS-ID" 342 consists of 42 bits and represents the calling station identification code. The "I(PCH)" slot location 344 consists of 62 bits and identifies the called station identification number. The "CRC" slot location 346 consists of 16 bits and represents the cyclic redundancy check. Slot locations 342 and 344 identify the cell station identification number and the called station identification number, respectively. These identification numbers are compared at comparator 226 (see FIG. 2) with the identification number of the cell station and the identification number of the cellular telephone stored in memory portion 224 (see FIG. 2).

Figure 4:
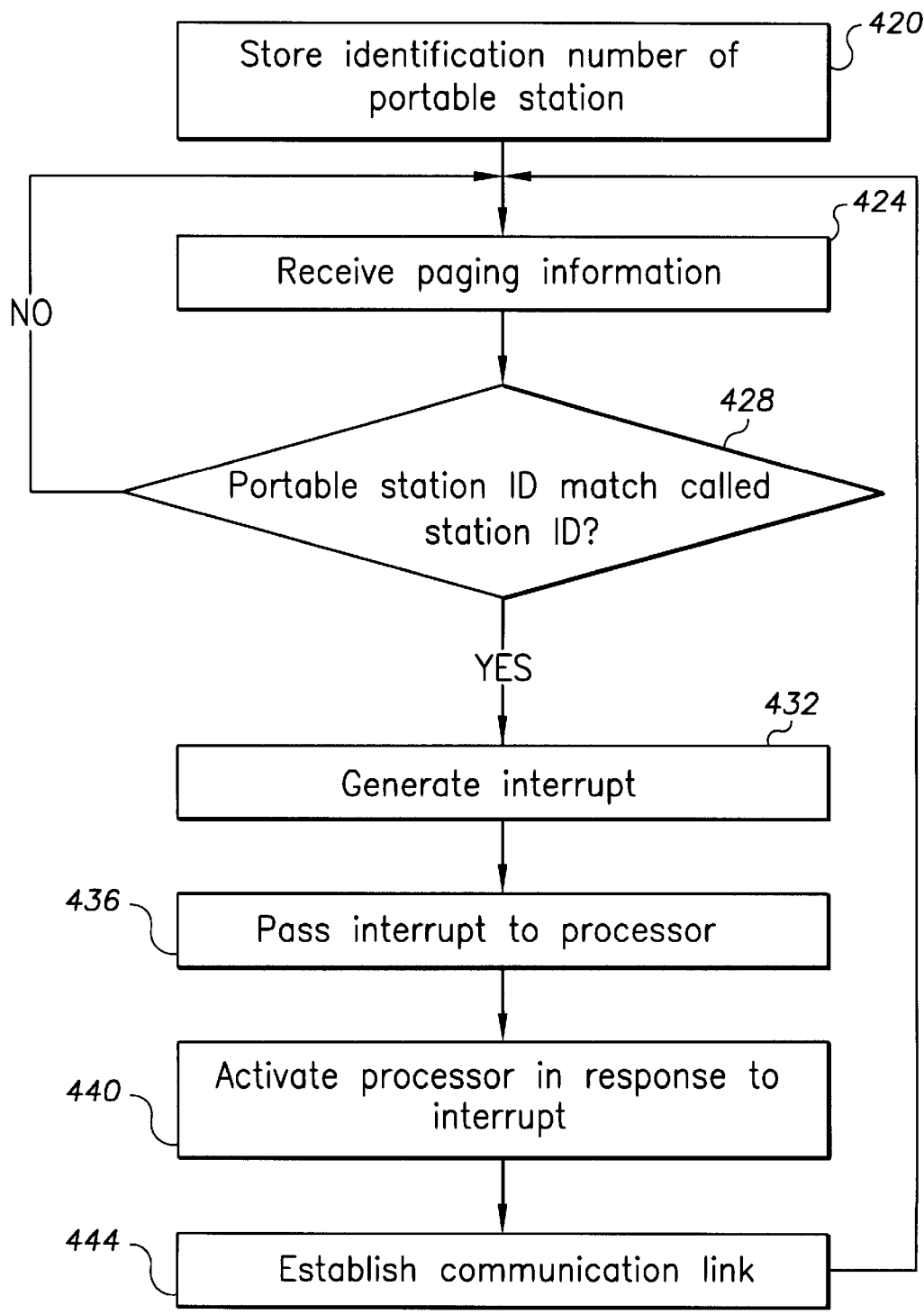
FIG. 4 is a flowchart illustrating exemplary steps, according to one embodiment of the present invention, for checking paging information in a personal handyphone system.

FIG. 4 illustrates a method for checking paging information according to one embodiment of the present invention. Initially, the identification number of the cellular telephone operating in accordance with the principles of the present invention is stored in the memory portion of the cellular telephone as illustrated in block 420. The memory portion could be, for example, a read only memory such as an erasable programmable read only memory. Subsequently, the cellular telephone receives paging information at the receiver as depicted in block 424. As mentioned, the paging information includes the identification numbers of the called station and the cell station from which the incoming data transfer is transmitted.

As illustrated in block 428, the identification number of the cellular telephone stored in the memory portion is compared to the identification number of the called station. If the identification numbers differ, no further action occurs, and the hardware circuit of the receiver continues to monitor for subsequent control information in the paging channel. If the identification numbers match, which indicates that the subsequent data transmission is intended for that cellular telephone, an interrupt is generated which passes to the processor as indicated by blocks 432 and 436. The processor, which previously had been in a power down mode, activates in response to the interrupt as indicated by block 440. The processor subsequently initiates the establishment of a communication link to receive the subsequent data transmission as indicated by block 444.

FIG. 5 illustrates a more detailed method for monitoring paging information in accordance with the principles of the present invention. As in FIG. 4, this method involves storing the identification number of the portable station which is illustrated by block 520. As further illustrated in block 522, the method depicted in FIG. 5 also stores the identification number of the cell station that transmits data within the designated area in which the cellular telephone incorporating the principles of the present invention is located.

The paging information is received at the receiver as shown in block 524. After receiving the paging information at the receiver, the stored identification numbers of the cellular telephone and the cell station are compared with the called station identification number and the cell station identification number contained in the received paging information. These comparison steps are illustrated in blocks 528 and 530. The additional step of comparing the cell station identification numbers in block 530 ensures that the cell station transmitting the subsequent data transmission is the same cell station from which the cellular telephone receives its data transmissions. If either the transmitted called station differs from the stored identification number of the cellular telephone or the transmitting cell station identification number differs from the stored cell station identification number, then the incoming data transmission is not directed to the cellular telephone. The receiver therefore continues to receive subsequent control information transmitted in the paging channel.

As illustrated in block 532, an interrupt is generated if both comparisons in blocks 528 and 530 result in matches. The interrupt then passes to the processor as shown by block 536. Upon receipt of the interrupt, the processor is activated and initiates the establishment of a communication link as illustrated in blocks 540 and 544. As mentioned in connection with the method of FIG. 4, prior to receipt of the interrupt the processor is in a power down mode. The interrupt activates, or wakes up, the processor, which in turn establishes a communication link for receipt of the subsequent data transmission.

As noted, the present invention is applicable to an apparatus and method for hardware checking control information transmitted in a personal handyphone system. Accordingly, the present invention should not be considered limited to the particular examples described above, but rather should be understood to cover all aspects of the invention as fairly set out in the attached claims. Various modifications, equivalent processes as well as numerous communication devices to which the present invention will be applicable will be readily apparent to those of skill in the art upon review of the present specification. The claims are intended to cover such modifications and devices.

What is claimed is:

1. A circuit arrangement for checking paging information transmitted in a personal handyphone system to a portable station having a unique identification number, and for activating a processor to initiate a communication link to the portable station, the paging information including the identification number of the called station and an identification number of a cell station from which the paging information is transmitted, the circuit arrangement comprising:

a first memory portion for storing the identification number of the portable station; and an interrupt generator coupled to the first memory portion and the processor, the processor having a low power mode and a high power mode and the interrupt generator having an operational mode that consumes less power than the processor in the high-power mode, the interrupt generator comparing, in the operational mode, an identification number of a called station received with paging information with the identification number of the portable station stored in the first memory portion and generating an interrupt when the identification number of the portable station matches the identification number of the called station, the processor responding to the interrupt by initiating a communication link to the portable station in response to the interrupt.

2. A circuit arrangement according to claim 1, further comprising a second memory portion for storing an identification number of a cell station from which the portable station receives calls.

3. A circuit arrangement according to claim 2, wherein the first memory portion is a read only memory.

4. A circuit arrangement according to claim 3, wherein the processor is adapted to activate from the low power mode in response to the interrupt.

5. A circuit arrangement for checking paging information transmitted in a personal handyphone system to a portable station having a unique identification number, and for activating a processor to initiate a communication link to the portable station, the paging information including the identification number of the called station and an identification number of a cell station from which the paging information is transmitted, the circuit arrangement comprising:
   a first memory portion for storing the identification number of the portable station;
   a second memory portion for storing an identification number of a cell station from which the portable station receives calls;
   an interrupt generator coupled to the first memory portion and the processor, the interrupt generator comparing an identification number of a called station received with paging information with the identification number of the portable station stored in the first memory portion, comparing the stored cell station identification number with the transmitted cell station identification number, and generating an interrupt in response to both the identification number of the portable station matching the identification number of the called station and the stored cell station identification number matching the transmitted cell station identification number, the processor being adapted to initiate a communication link to the portable station in response to the interrupt.

6. A circuit arrangement for checking paging information transmitted in a personal handyphone system to a portable station having a unique identification number, and for activating a processor from a lower power mode to initiate a link to the portable station, the paging information including an identification number of a called station and an identification number of a cell station from which the paging information is transmitted, the circuit arrangement comprising:
   a first memory portion for storing the identification number of the portable station;
   a logic device coupled to the first memory portion and having an operational mode that consumes less power than the processor when the processor is in an operational mode other than the low power mode, the logic device comparing an identification number of the portable station stored in the first memory portion with the identification number of a called station received with paging information, the logic device providing an output signal having a first state indicating that the identification number of the called station matches the identification number of the portable station; and
   a control device for generating an interrupt when the output from the control device is in the first state, the processor adapted for activating from the low power mode and initiating a communication link to the portable station is in response to the interrupt.

7. A circuit arrangement according to claim 6, further comprising a second memory portion for storing an identification number of a cell station from which the portable station receives calls.

8. A circuit arrangement according to claim 7, wherein the first memory portion is a read only memory.

9. A circuit arrangement according to claim 8, wherein the second memory portion is a random access memory.

10. A circuit arrangement for checking paging information transmitted in a personal handyphone system to a portable station having a unique identification number, and for activating a processor to initiate a link to the portable station, the paging information including an identification number of a called station and an identification number of a cell station from which the paging information is transmitted, the circuit arrangement comprising:
    a first memory portion for storing the identification number of the portable station;
    a second memory portion for storing an identification number of a cell station from which the portable station receives calls;
    a logic device coupled to the first memory portion, the logic device comparing an identification number of the portable station stored in the first memory portion with the identification number of a called station received with paging information and comparing the stored cell station identification number with the transmitted cell station identification number, the logic device indicating a first state corresponding to the identification number of the called station matching the identification number of the portable station; and
    a control device being adapted to generate an interrupt in response to the first state and the stored cell station identification number matching the transmitted cell station identification number, the processor being adapted to activate from a low power mode and initiate a communication link to the portable station in response to the interrupt.

11. A cellular telephone for operating in a personal handyphone system and having a unique identification number, the cellular telephone comprising:
    a receiver for receiving paging information, the paging information including an identification number of a called station and an identification number of a cell station from which the paging information is transmitted;
    a circuit arrangement coupled to the receiver and having a first memory portion for storing the identification number of the telephone, a second memory portion for storing an identification number of a cell station from which the telephone receives calls, and an interrupt generator coupled to the first memory portion and the second memory portion, the interrupt generator comparing the identification number of the called station with the identification number of the telephone, comparing the stored identification number of the cell station with the identification number of the cell station from the paging information, and generating an interrupt in response to the event in which both the identification number of the telephone matches the identification number of the called station and the stored identification number of the cell station matches the identification number of the cell station from the paging information;

a processor coupled to the interrupt generator to receive the interrupt, the processor adapted for activating from a low power mode and initiating a communication link to the telephone in response to the interrupt; and a portable power supply coupled to supply power to the processor and to the interrupt generator.

12. A telephone according to claim 11, wherein the first memory portion is a read only memory.

13. A telephone according to claim 11, wherein the second memory portion is a read only memory.

14. A cellular telephone for operating in a personal handyphone system and having a unique identification number, the cellular telephone comprising:

a receiver for receiving paging information, the paging information including an identification number of a called station and an identification number of a cell station from which the paging information is transmitted;

a circuit arrangement coupled to the receiver and having a first memory portion for storing the identification number of the telephone, and an interrupt generator coupled to the first memory portion, the interrupt generator comparing the identification number of the called station with the identification number of the telephone and generating an interrupt when the identification number of the telephone matches the identification number of the called station and wherein the interrupt generator compares the stored cell station identification number with the transmitted cell station identification number and generates the interrupt when the stored cell station identification number matches the transmitted cell station identification number;

a processor coupled to the interrupt generator to receive the interrupt, the processor adapted for activating from a low power mode and initiating a communication link to the telephone in response to the interrupt; and a portable power supply coupled to supply power to the processor and to the interrupt generator.

15. A method for checking paging information transmitted in personal handyphone system to a portable station having a unique identification number and further having a circuit arrangement for generating a control signal to pass to a processor, the paging information including an identification number of a called station and an identification number of a cell station from which the paging information is transmitted, the method comprising:

storing the identification number of the portable station in a first memory portion;

generating an interrupt at the circuit arrangement when the identification number of the portable station matches the identification number of the called station or when the stored cell station identification number matches the transmitted cell station identification number;

passing the interrupt to the processor;

establishing a communication link to the portable station, wherein the processor adapted to activate from a low power mode and establish the communication link in response to receiving the interrupt; and storing in the first memory portion an identification number of a cell station from which the portable station receives calls.

* * * * *